(12) United States Patent
Meyer et al.

(10) Patent No.: US 9,512,942 B2
(45) Date of Patent: Dec. 6, 2016

(54) COLD-INSULATED PIPE SUPPORT

(71) Applicant: Lisega SE, Zeven (DE)

(72) Inventors: Luder Meyer, Tarmstedt (DE); Florian Senkpiel, Zeven (DE)

(73) Assignee: Lisega SE, Zeven (DE)

( * ) Notice: Subject to any disclaimer, the term of this patent is extended or adjusted under 35 U.S.C. 154(b) by 0 days.

(21) Appl. No.: 13/858,457

(22) Filed: Apr. 8, 2013

(65) Prior Publication Data

US 2013/0327898 A1    Dec. 12, 2013

(30) Foreign Application Priority Data

Jun. 12, 2012 (DE) .................. 10 2012 209 764

(51) Int. Cl.
*F16L 3/10* (2006.01)
*F16L 3/26* (2006.01)
*F16L 59/135* (2006.01)

(52) U.S. Cl.
CPC ............... *F16L 3/26* (2013.01); *F16L 3/1016* (2013.01); *F16L 59/135* (2013.01)

(58) Field of Classification Search
CPC .......... F16L 3/1091; F16L 3/1207; F16L 3/00; F16L 3/26; F16L 3/1016; F16L 59/135; F24F 13/0263
USPC ............... 248/65, 74.1, 560, 562, 609, 634, 636,248/53, 49; 138/106, 149, 177, 178
See application file for complete search history.

(56) References Cited

U.S. PATENT DOCUMENTS 3,554,474 A * 1/1971 Davies ........................... 248/49
3,863,679 A * 2/1975 Young ........................... 138/106
4,323,088 A * 4/1982 McClellan .................... 138/106
4,530,478 A * 7/1985 McClellan ..................... 248/62
4,605,043 A * 8/1986 Grenier ......................... 138/149
4,804,158 A * 2/1989 Collins et al. ............... 248/74.4

(Continued)

FOREIGN PATENT DOCUMENTS

CN    1605761 A    4/2005
CN    202165700 U    3/2012

(Continued)

OTHER PUBLICATIONS

German language International Search Report dated Jul. 24, 2013, received in corresponding PCT Application No. PCT/EP2013/059153, 5 pgs.

(Continued)

*Primary Examiner* — Nkeisha Smith
(74) *Attorney, Agent, or Firm* — Grossman Tucker Perreault & Pfleger, PLLC

(57) ABSTRACT

A cold-insulated pipe support for a pipeline comprising a receiving space for a pipe portion, a heat insulating layer of solid insulating material, that surrounds the receiving space, an outer protective casing, a vapor barrier arranged between the heat insulating layer and the outer protective casing, two part-circular support shells The support shells are of a shorter configuration at both support ends in the axial direction than the other support portions, wherein there remains a free support portion. Provided in the region of the free support portions at the two ends are contact elements which bear directly against the ends of the support shells. The contact elements are fixed by means of radially screwed-in headed screws which are anchored through the protective casing and the vapor barrier in the solid heat insulating layer.

47 Claims, 5 Drawing Sheets

(56) References Cited

U.S. PATENT DOCUMENTS

Figure 1:
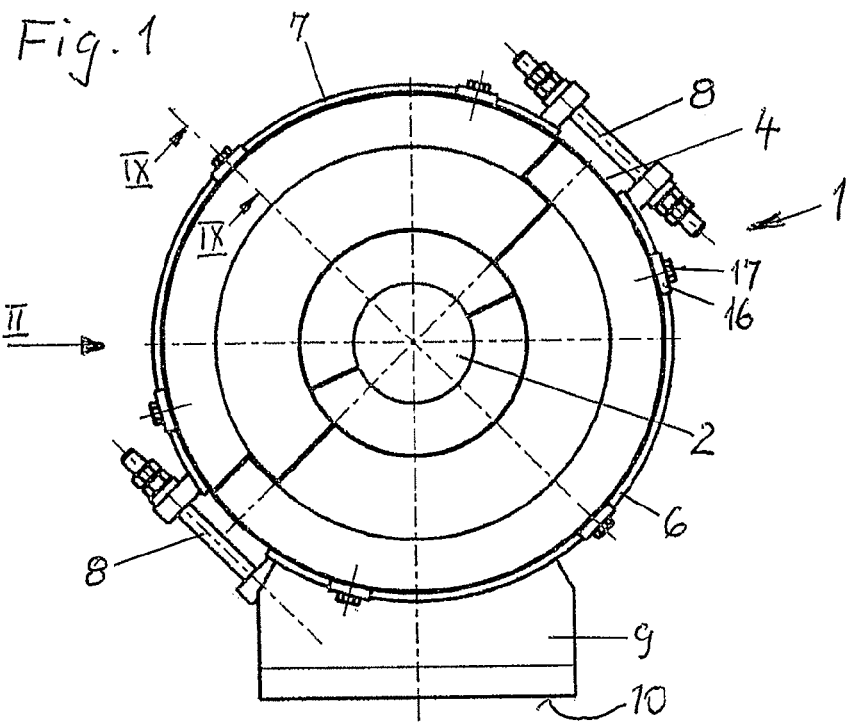

| | | | |
|---|---|---|---|
| 4,932,619 A * | 6/1990 | Usui | 248/74.1 |
| 4,951,902 A * | 8/1990 | Hardtke | 248/74.1 |
| 5,192,039 A | 3/1993 | Williams | |
| 5,301,907 A * | 4/1994 | Julian | 248/74.1 |
| 6,031,972 A * | 2/2000 | Barker | 392/478 |
| 6,575,412 B2 * | 6/2003 | Klezath | 248/58 |
| 7,213,790 B2 * | 5/2007 | Bailey et al. | 248/65 |
| 7,472,870 B2 * | 1/2009 | Zagorski et al. | 248/65 |
| 7,861,983 B2 * | 1/2011 | Lange et al. | 248/74.4 |
| 7,950,609 B2 * | 5/2011 | Pothanikat et al. | 248/65 |
| 7,997,541 B2 * | 8/2011 | Pothanikat et al. | 248/74.1 |
| 8,505,857 B2 * | 8/2013 | Mark et al. | 248/65 |
| 8,763,648 B2 * | 7/2014 | Senkpiel | 138/149 |
| 2002/0060274 A1 * | 5/2002 | Klezath | 248/58 |
| 2003/0213525 A1 * | 11/2003 | Patel et al. | 138/149 |
| 2005/0253024 A1 | 11/2005 | Zagorski et al. | |
| 2009/0095847 A1 * | 4/2009 | Lange et al. | 248/74.1 |
| 2009/0127407 A1 * | 5/2009 | Pothanikat et al. | 248/74.1 |
| 2011/0309207 A1 * | 12/2011 | Senkpiel | 248/70 |
| 2012/0181413 A1 * | 7/2012 | Steinhorst et al. | 248/636 |

FOREIGN PATENT DOCUMENTS

| | | |
|---|---|---|
| DE | 102005013728 A1 | 11/2006 |
| DE | 102009008140 A1 | 8/2010 |
| JP | 2995149 B2 | 12/1999 |
| JP | 2004100944 A | 4/2004 |

OTHER PUBLICATIONS

English language International Search Report mailed Jul. 24, 2013, received in corresponding PCT Application No. PCT/EP13/59153, 3 pgs.

English translation with Chinese Office Action dated Aug. 5, 2015, received in corresponding Chinese Application No. 201380031121.6, 15 pgs.

\* cited by examiner

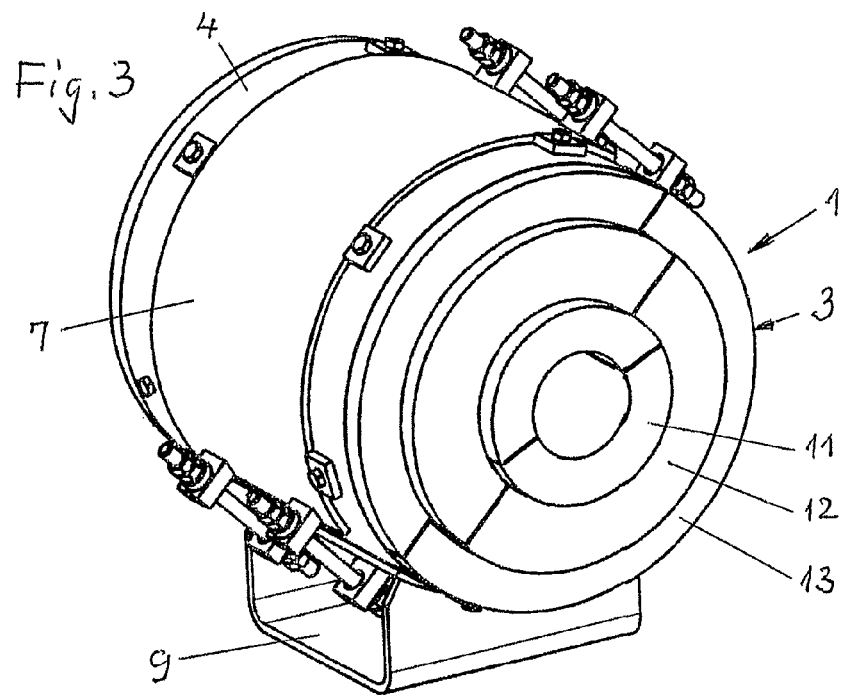
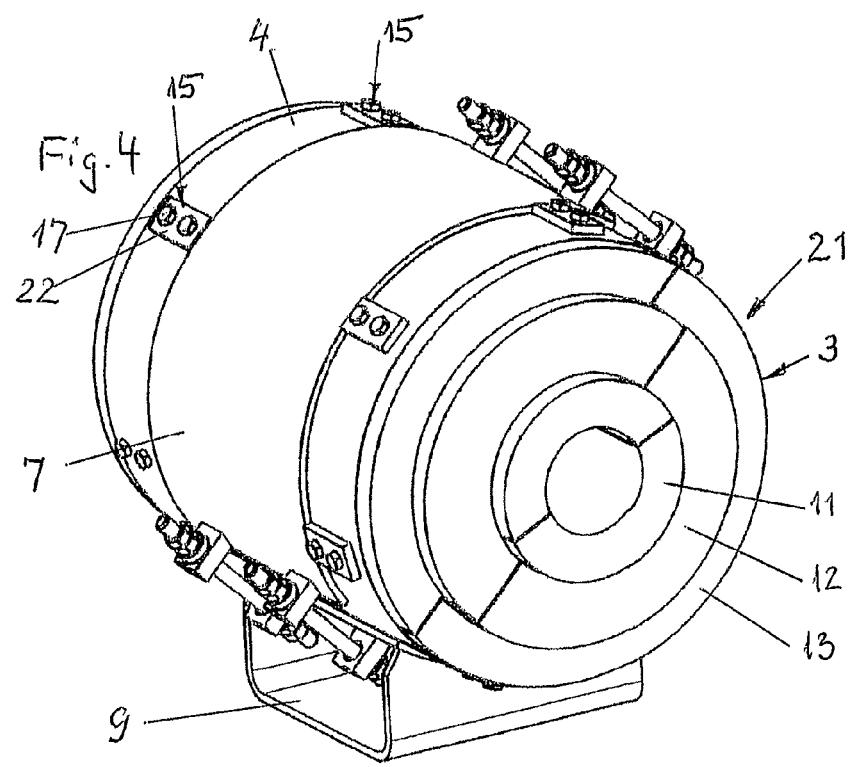

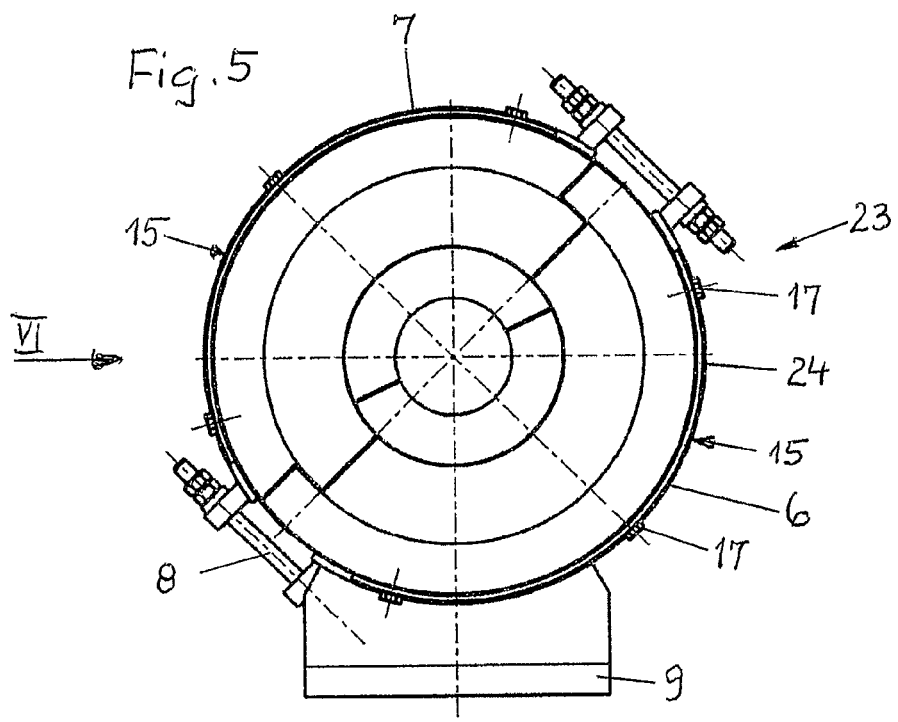
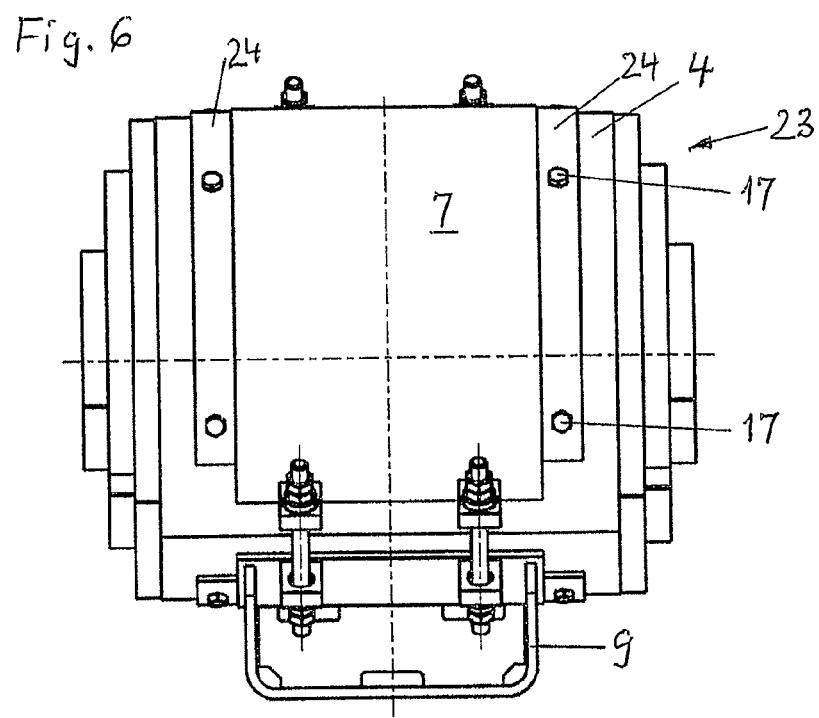

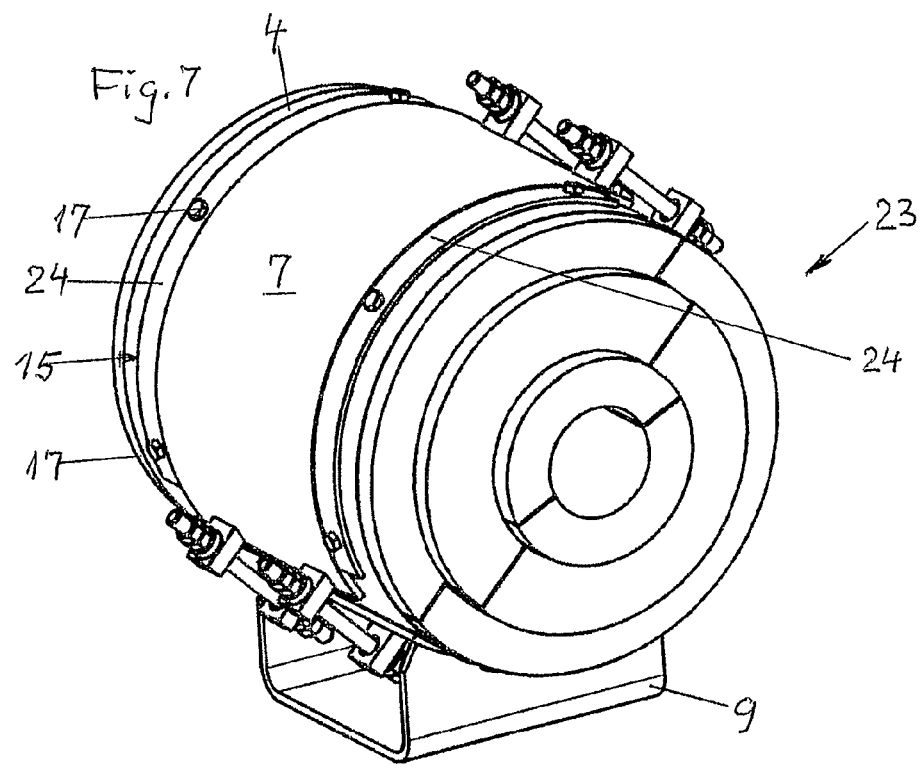
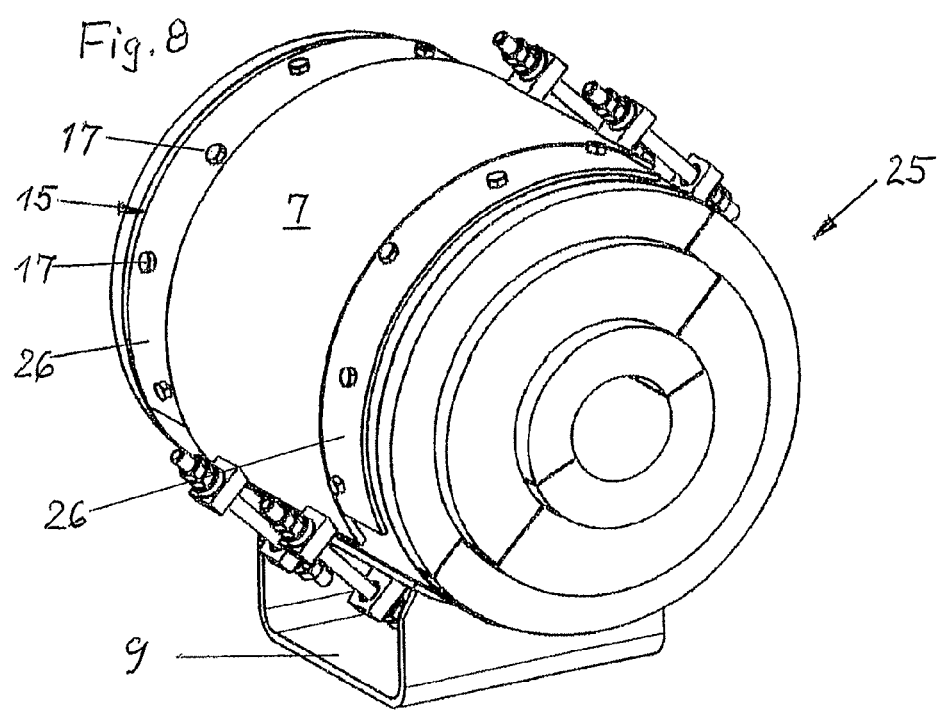

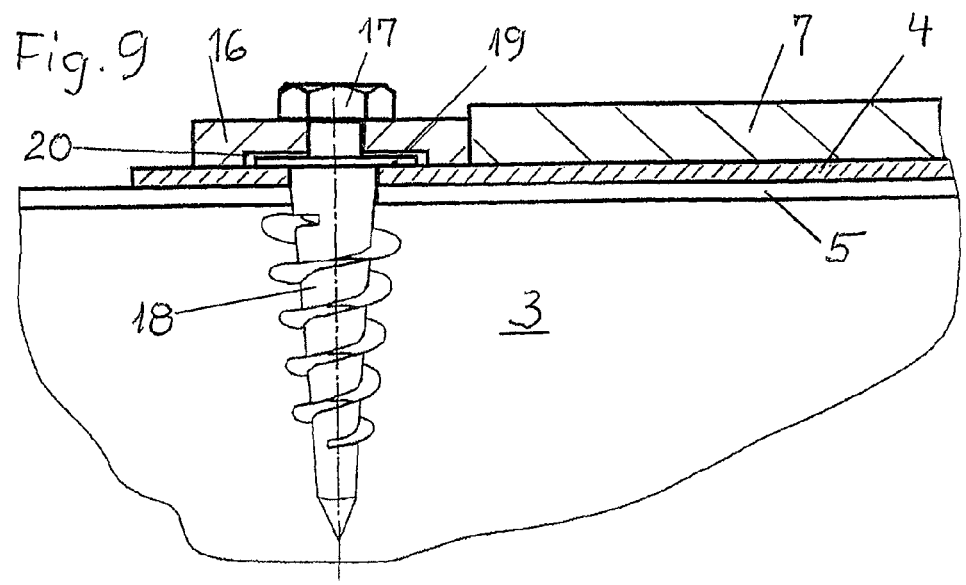
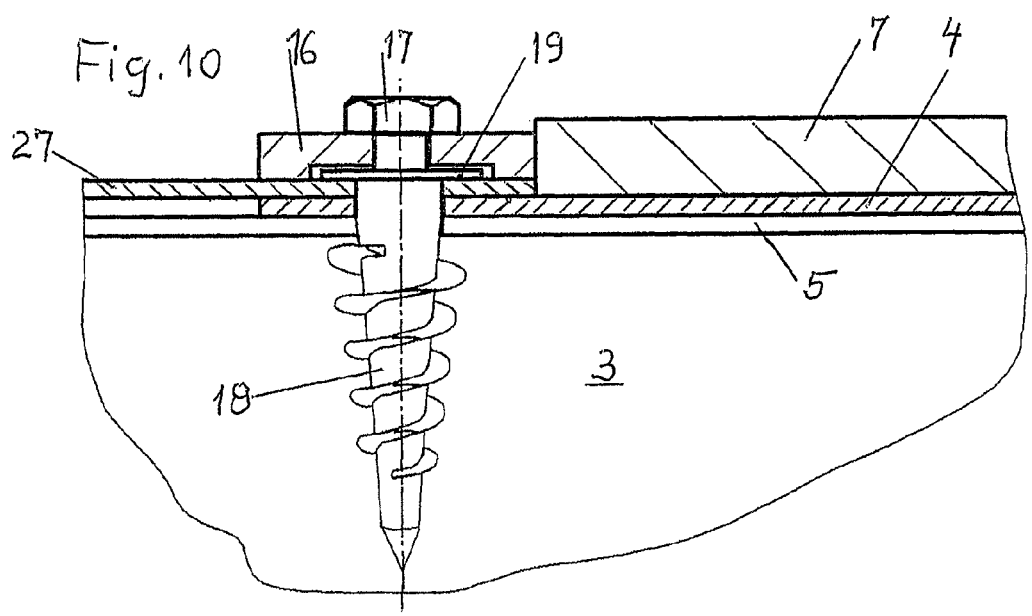

COLD-INSULATED PIPE SUPPORT

The invention concerns a cold-insulated pipe support for a pipeline, in particular for a low-temperature pipeline, comprising a receiving space for a pipe portion, which receiving space passes through the pipe support and is adapted to the cross-section of the pipeline, a heat insulating layer of solid insulating material, that surrounds the receiving space, an outer protective casing, a vapor barrier arranged between the heat insulating layer and the outer protective casing, at least two part-circular support shells which embrace the pipe support and which are connected together by clamping screws, wherein the lower support shell is connected to the base carrying the pipe support, as well as an axial fixing of the support portions relative to the support shells.

Cold-insulated pipe supports of that kind are used in cryogenics pipeline systems which transport for example liquid gases, which supports have to slide on the supporting surface, for example a steel structure, by virtue of the large temperature-induced expansion phenomena in the pipeline. So that the frictional force of the surface on which the pipe support is standing is overcome the force must be transmitted from the pipeline through the heat insulating layer into the outer support shells which comprise metal, and thus to the base.

Known cold-insulated pipe supports (DE 10 2009 008 140 A1 and DE 10 2005 013 728 A1) have admittedly proven themselves best in practice, but under extreme conditions, in particular when very great temperature expansion effects are involved, the result can be that the heat insulating layer is so heavily loaded that damage to the pipe support occurs for the material pairings of insulating foam/vapor barrier and/or vapor barrier/protective casing cannot transmit the necessary forces so that the inner part of the pipe support is moved relative to the outer support shells and the vapor barrier tears. The attempt is usually made to transmit the necessary force by friction, but then very high contact pressing forces are required, which have to be generated by the screw means of the support shells. As the heat insulating layer is also subjected to temperature-induced expansion the screw means of the support shells are frequently equipped with plate springs to compensate for the changes in diameter. That measure on its own however is frequently insufficient under very extreme conditions.

Therefore the object of the invention is to provide a cold-insulated pipe support which even under very extreme conditions does not suffer any damage and which fully performs its function even in the event of very great temperature-induced expansion of the pipeline.

According to the invention that object is attained in that the support shells are of a shorter configuration at both support ends in the axial direction than the other support portions, wherein there remains a free support portion which is not covered by the support shells, provided in the region of the free support portions at the two ends are contact elements which bear directly against the ends of the support shells, and the contact elements are fixed by means of radially screwed-in headed screws which are anchored through the protective casing and the vapor barrier in the solid heat insulating layer.

The heat insulating layer is less loaded by means of the structure according to the invention so that there are almost no relative movements between the support shells and the heat insulating layer. That positive effect ensures that a permanently hermetically closed vapor barrier is guaranteed so that in this respect also the structure according to the invention affords an extremely positive effect.

The contact elements can be in the form of metal blocks which are arranged at spacings and which are respectively fixed with at least one screw. In a preferred embodiment the metal blocks are somewhat longer and are fixed with two respective axially successively arranged screws so that optimum stability is achieved.

Alternatively the contact elements can also be in the form of part-circular metal portions which extend along the circular arc of the respective support shells and are fixed with a plurality of screws which are screwed in at spacings.

A particularly stable arrangement is achieved if the part-circular metal portions are somewhat wider and are fixed with at least two respective axially successively arranged rows of screws, wherein the screws of the different rows can be displaced relative to each other in the peripheral direction.

Normally HD foam, for example hard polyurethane foam, is used as the material for the heat insulating layer. It is therefore important for the screws which are to be screwed into the heat insulating layer to be fixedly anchored therein. Preferably therefore the screws are screwed into dowels which are introduced into the heat insulating layer.

Suitable dowels are for example commercially available plastic screw dowels which afford a good anchoring option.

Pre-drilled blind holes which are desirably in the form of stepped bores are provided for insertion of the dowels.

In the assembly procedure the blind holes are at least partially filled with an adhesive material before introduction of the dowels so as to achieve an optimum fit for the dowels in the heat insulating layer. In addition the dowels are in turn at least partially filled with an adhesive material before the screws are screwed in, to make the fit for the screws even firmer and more reliable.

Preferably dowels with plate-shaped heads are used, which in the inserted condition of the dowels bear on the protective casing on the outside thereof.

To achieve an optimum fit for the contact elements they can be provided at their undersides that are towards the pipe support, around the screw holes, with cylindrical countersink portions which engage over the plate-shaped heads of the dowels.

To be able to maintain the vapor barrier even in extreme situations, an adhesive which optimally influences the sealing integrity of the vapor barrier can be introduced in the assembly procedure between the heads of the screws and the protective casing and between the contact elements and the protective casing.

The structure according to the invention also has the advantage that it can also be retro-fitted in the case of known pipe supports which are in use. For that purpose it is necessary to provide a cover plate for connection to the outer skin of the pipe insulation, in which case the cover plate partially overlaps the protective casing of the pipe support. In the case of such a retro-fitting procedure the dowels and screws preferably also engage through the cover plate.

Figure 2:
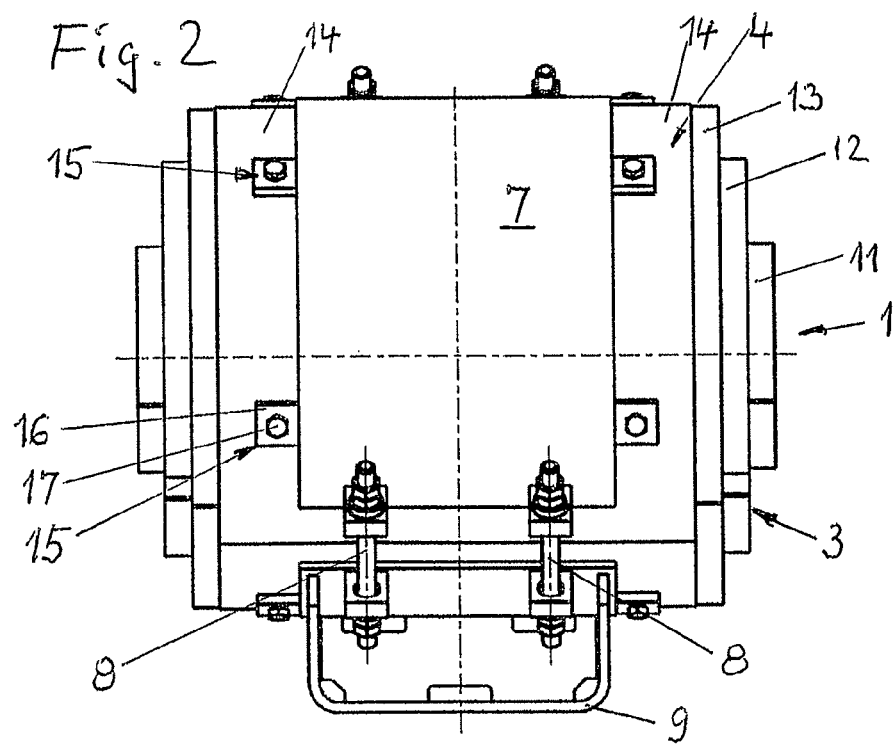

The invention is shown by way of example in the drawings and is described in detail hereinafter with reference to the drawing in which:

FIG. 1 shows an end view of a first embodiment of the pipe support according to the invention, FIG. 2 shows a side view in the direction of the arrow II in FIG. 1, FIG. 3 shows a perspective view of the pipe support of FIGS. 1 and 2, FIG. 4 shows the same perspective view as FIG. 3 of a modified embodiment, FIG. 5 shows an end view of a further embodiment of the pipe support according to the invention, FIG. 6 shows a side view of the pipe support of FIG. 5 in the direction of the arrow VI, FIG. 7 shows a perspective view of the pipe support of FIGS. 5 and 6, FIG. 8 shows the same perspective view as FIG. 7 of a modified embodiment of the pipe support of FIGS. 5 through 7, FIG. 9 shows a greatly enlarged view in section along line IX-IX in FIG. 1, and FIG. 10 shows the same section as in FIG. 9 for retrofitting of a conventional pipe support.

FIGS. 1 through 3 of the drawing show a first embodiment of a cold-insulated pipe support 1 intended for holding a low-temperature pipeline. In its center the pipe support 1 has a receiving space 2 for a pipe portion, wherein the receiving space 2 is surrounded by a heat insulating layer 3 of solid insulating material. The insulating material used is generally HD foam, in particular hard polyurethane foam.

As can be seen in particular from the enlarged portion in FIG. 9 the heat insulating layer 3 is enclosed by an outer protective casing 4 which preferably comprises metal sheet. A vapor barrier 5 is provided between the heat insulating layer 3 and the protective casing 4.

That structure is enclosed by two part-circular support shells 6 and 7 which are of an almost semicircular configuration. The support shells 6 and 7 are pressed against the support structure by means of screw connections 8 so that this gives a compact unit. The screw connections 8 are in this case provided with plate springs to accommodate possible expansion and shrinkage of the support structure.

The lower support shell 6 is fixedly connected to a base portion 9, wherein, as the two parts preferably comprise steel, they are welded together. Insofar as the pipe support involves a floating support, the underside 10 of the base portion 9 can slide freely on a smooth support surface.

In the embodiments illustrated in the Figures the heat insulating layer 3 comprises three mutually concentrically arranged foam sleeves 11, 12, 13 which are disposed one within the other in positively locking relationship and which are each centrally divided, wherein the portion divisions are displaced relative to each other. The individual foam sleeves 11, 12, 13 can be of differing densities, the inner sleeve 11 which is connected directly to the pipe to be insulated being of the highest density. The free cylinder and end faces of the three foam sleeves 11, 12, 13 are sealed so as to provide for an adequate vapor barrier effect. Alternatively the two outer foam sleeves 12, 13 may also be made jointly from one piece.

The support shells 6, 7 are shorter in the axial direction at the two support ends, than the other support portions, wherein remaining on both sides of the pipe support 1 on the protective casing 4 is a free support portion 14 which is not covered by the support shells 6, 7. Provided in the region of the free support portions 14 at both sides are contact elements 15 which bear directly against the ends of the support shells 6, 7. In the embodiment illustrated in FIGS. 1 through 3 the contact elements 15 are in the form of metal blocks 16 which are arranged at spacings and which are fixed by means of headed screws 17 which are radially screwed in. As can be seen in particular from FIG. 9 the headed screws 17 are anchored through the protective casing 4 and the vapor barrier 5 in the heat insulating layer 3.

As shown in the detail view of FIG. 9 the screws 17 are screwed into dowels 18 which have been previously introduced into the heat insulating layer 3. Commercially available plastic screw dowels provided with plate-shaped heads 19 can be used as the dowels 18.

For insertion of the dowels 18, blind holes are pre-drilled which are desirably in the form of stepped bores. Before the dowels 18 are introduced into the blind bores they are at least partially filled with an adhesive material to optimize the fit for the dowels in the blind holes.

Before the screws 17 are screwed into the dowels 18 the dowels 18 are also at least partially filled with an adhesive material so that the fit of the screws in the dowels is also optimized.

As can be seen in particular from FIG. 9 the plate-shaped heads 19 of the dowels 18 bear externally on the protective casing 4 and extend through the protective casing 4 as well as the vapor barrier 5 into the heat insulating layer 3.

At their undersides towards the pipe support 1 the metal blocks are provided around the screw holes with cylindrical countersink portions 20 which engage over the plate-shaped heads 19 of the dowels 18.

FIG. 4 shows a pipe support 21 which has essentially the same features as the first embodiment illustrated in FIGS. 1 through 3. Identical components are accordingly identified by the same reference numbers. The only difference is that the metal blocks 22 are of an elongate configuration in the axial direction of the pipe support 21 and those metal blocks 22 are respectively fixed with two headed screws 17 arranged in succession in the axial direction. That measure still somewhat improves stability of the pipe support 21 in relation to the pipe support 1.

FIGS. 5 through 7 show a third embodiment of a pipe support 23 which except for the contact elements 15 is identical to the embodiments shown in FIGS. 1 through 4. In this embodiment the contact elements 15 are in the form of part-circular metal portions 24 which extend along the circular arc of the respective support shells 6, 7 and are fixed with a plurality of headed screws 17 which are screwed in at spacings. By means of those part-circular metal portions 24 the axial end faces of the support shells 6, 7 involve continuous contact. In the embodiment shown in FIGS. 5 through 7 the respective contact elements 15 extend around almost the entire circular arc at the end of the respective support shells 6 and 7. In this case, as in the detail view in FIG. 9, the headed screws 17 are screwed into corresponding screw dowels 18.

FIG. 8 shows a variant of the embodiment illustrated in FIGS. 5 through 7. In FIG. 8 in this pipe support 25 the contact elements 15 are of a reinforced structure, more specifically the part-circular metal portions 26 are somewhat wider than the metal portions 24 of the embodiment shown in FIGS. 5 through 7. Those metal portions 26 are fixed with two rows of headed screws 17, the rows being arranged in succession in the axial direction, wherein the screws 17 of the different rows are arranged in mutually relatively displaced relationship in the peripheral direction.

In all four embodiments, it must be noted that the vapor barrier remains maintained even under extreme loadings. For that purpose provided between the heads of the screws 17 and the protective casing 4 on the one hand and between the contact elements 15 and the protective casing 4 on the other hand is an adhesive layer which serves for integrity of the structure so that a hermetically closed vapor barrier is afforded.

Conventional known pipe supports can be readily retrofitted to the new standard as described above.

For that purpose it is necessary that, as shown in FIG. 10, a cover plate 27 is additionally fitted for connection to the outer skin of the pipe insulation. In that case the cover plate 27 partially overlaps the protective casing 4 so that the screws 17 also engage through the cover plate 27 to fix it to the respective pipe support. In this embodiment the dowels 18 also extend through the cover plate 27, wherein the plate-shaped heads 19 of the dowels 18, in the assembled condition, bear against the top side of the cover plate 27. Retro-fitting of conventional cold-insulated pipe supports to give the new standard is thus readily possible with a low level of technical complication and expenditure.

LIST OF REFERENCES

1 Pipe support
2 Receiving space
3 Heat insulating layer
4 Protective casing
5 Vapor barrier
6 Support shell
7 Support shell
8 Screw connections
9 Base portion
10 Underside of the base portion
11 Foam sleeve
12 Foam sleeve
13 Foam sleeve
14 Free support portion
15 Contact elements
16 Metal blocks
17 Headed screws
18 Dowel
19 Plate-shaped heads
20 Countersink portions
21 Pipe support
22 Metal blocks
23 Pipe support
24 Part-circular metal portions
25 Pipe support
26 Part-circular metal portions
27 Cover plate

What is claimed is:

1. A cold-insulated pipe support for a pipeline, in particular for a low-temperature pipeline, comprising:
a receiving space for a pipe portion, the receiving space adapted to a cross-section of the pipeline,
a heat insulating layer of solid insulating material that surrounds the receiving space, the receiving space extending axially through the heat insulating layer along a length of the pipeline;
an outer protective casing having an axial length extending along a length of the pipeline;
a vapor barrier arranged between the heat insulating layer and the outer protective casing; and
at least two part-circular support shells each of the part-circular support shells having two ends and two lateral sides; wherein the part-circular support shells at least partially embrace the pipe, the ends of each of the part-circular support shells connected together by clamping screws,
wherein one of the support shells is connected to a base carrying the pipe support,
wherein the outer protective casing is axially fixed with respect to the two part-circular support shells; such that each of the two part-circular support shells are of a shorter axial length than the axial length of the outer protective casing,
wherein free support portions are defined by exposed portions of the outer protective casing that extend beyond the lateral sides of the support shells and that are not covered by the support shells;
wherein provided in the free support portions proximate the lateral sides of the support shells are contact elements which bear directly against the lateral sides of the support shells;
wherein the contact elements are fixed by means of radially screwed-in headed screws which are anchored through the outer protective casing and the vapor barrier in the solid heat insulating layer; and
wherein the contact elements are in a form of spaced metal blocks which are respectively fixed with at least one screw of the headed screws.

2. A cold-insulated pipe support as set forth in claim 1 characterised in that the metal blocks are fixed with two respective headed screws of the headed screws arranged in succession in an axial direction.

3. A cold-insulated pipe support as set forth in claim 1 characterised in that the headed screws are screwed into dowels anchored in the heat insulating layer.

4. A cold-insulated pipe support as set forth in claim 3 characterised in that the dowels are in a form of plastic screw dowels.

5. A cold-insulated pipe support as set forth in claim 4 characterised in that the dowels have plate-shaped heads which bear against the protective casing.

6. A cold-insulated pipe support as set forth in claim 5 characterised in that the contact elements are disposed at undersides towards the pipe support and are provided around screw holes with cylindrical countersunk portions which engage over the plate-shaped heads of the dowels.

7. A cold-insulated pipe support as set forth in claim 3 characterised in that there are provided pre-drilled blind holes for insertion of the dowels.

8. A cold-insulated pipe support as set forth in claim 7 characterised in that the blind holes are in a form of stepped bores.

9. A cold-insulated pipe support as set forth in claim 7 characterised in that the blind holes are at least partially filled with an adhesive material prior to introduction of the dowels.

10. A cold-insulated pipe support as set forth in claim 3 characterised in that the dowels are at least partially filled with an adhesive material before the headed screws are screwed in.

11. A cold-insulated pipe support as set forth in claim 1 characterised in that an adhesive layer is provided between the heads of the headed screws and the protective casing and between the contact elements and the protective casing.

12. A cold-insulated pipe support as set forth in claim 1, in particular for retro-fitting of conventional pipe supports, characterised in that there is provided a cover plate for connection to an outer skin of the heat insulating layer, the cover plate partially overlaps the protective casing of the pipe support and dowels and headed screws also engage through the cover plate.

13. A cold-insulated pipe support for a pipeline, in particular for a low-temperature pipeline, comprising
a receiving space for a pipe portion, the receiving space adapted to a cross-section of the pipeline,
a heat insulating layer of solid insulating material that surrounds the receiving space, the receiving space extending axially through the heat insulating layer along a length of the pipeline;
an outer protective casing having an axial length extending along a length of the pipeline;
a vapor barrier arranged between the heat insulating layer and the outer protective casing; and
at least two part-circular support shells each of the part-circular support shells having two ends and two lateral sides; wherein the part-circular support shells at least partially embrace the pipe, the ends of each of the part-circular support shells connected together by clamping screws,
wherein one of the support shells is connected to a base carrying the pipe support,
wherein the outer protective casing is axially fixed with respect to the two part-circular support shells; such that each of the two part-circular support shells are of a shorter axial length than the axial length of the outer protective casing,
wherein free support portions are defined by exposed portions of the outer protective casing that extend beyond the lateral sides of the support shells and that are not covered by the support shells;
wherein provided in the free support portions proximate the lateral sides of the support shells are contact elements which bear directly against the lateral sides of the support shells;
wherein the contact elements are fixed by means of radially screwed-in headed screws which are anchored through the outer protective casing and the vapor barrier in the solid heat insulating layer; and
wherein the headed screws are screwed into dowels anchored in the heat insulating layer.

14. A cold-insulated pipe support as set forth in claim 13 characterised in that the contact elements are in a form of part-circular metal portions which extend along a circular arc of respective support shells and are fixed with a plurality of headed screws which are screwed in at spacings.

15. A cold-insulated pipe support as set forth in claim 14 characterised in that the part-circular metal portions are fixed with at least two respective rows, arranged in succession in an axial direction, of headed screws and the headed screws of the different rows are displaced relative to each other in a peripheral direction.

16. A cold-insulated pipe support as set forth in claim 13 characterised in that the dowels are in a form of plastic screw dowels.

17. A cold-insulated pipe support as set forth in claim 16 characterised in that the dowels have plate-shaped heads which bear against the protective casing.

18. A cold-insulated pipe support as set forth in claim 17 characterised in that the contact elements are disposed at undersides towards the pipe support and are provided around screw holes with cylindrical countersunk portions which engage over the plate-shaped heads of the dowels.

19. A cold-insulated pipe support as set forth in claim 13 characterised in that there are provided pre-drilled blind holes for insertion of the dowels.

20. A cold-insulated pipe support as set forth in claim 19 characterised in that the blind holes are in a form of stepped bores.

21. A cold-insulated pipe support as set forth in claim 19 characterised in that the blind holes are at least partially filled with an adhesive material prior to introduction of the dowels.

22. A cold-insulated pipe support as set forth in claim 13 characterised in that the dowels are at least partially filled with an adhesive material before the headed screws are screwed in.

23. A cold-insulated pipe support as set forth in claim 13 characterised in that an adhesive layer is provided between the heads of the headed screws and the protective casing and between the contact elements and the protective casing.

24. A cold-insulated pipe support as set forth in claim 13, in particular for retro-fitting of conventional pipe supports, characterised in that there is provided a cover plate for connection to an outer skin of the heat insulating layer, the cover plate partially overlaps the protective casing of the pipe support and dowels and headed screws also engage through the cover plate.

25. A cold-insulated pipe support for a pipeline, in particular for a low-temperature pipeline, comprising
a receiving space for a pipe portion, the receiving space adapted to a cross-section of the pipeline,
a heat insulating layer of solid insulating material that surrounds the receiving space, the receiving space extending axially through the heat insulating layer along a length of the pipeline;
an outer protective casing having an axial length extending along a length of the pipeline;
a vapor barrier arranged between the heat insulating layer and the outer protective casing; and
at least two part-circular support shells each of the part-circular support shells having two ends and two lateral sides; wherein the part-circular support shells at least partially embrace the pipe, the ends of each of the part-circular support shells connected together by clamping screws,
wherein one of the support shells is connected to a base carrying the pipe support,
wherein the outer protective casing is axially fixed with respect to the two part-circular support shells; such that each of the two part-circular support shells are of a shorter axial length than the axial length of the outer protective casing,
wherein free support portions are defined by exposed portions of the outer protective casing that extend beyond the lateral sides of the support shells and that are not covered by the support shells;
wherein provided in the free support portions proximate the lateral sides of the support shells are contact elements which bear directly against the lateral sides of the support shells;
wherein the contact elements are fixed by means of radially screwed-in headed screws which are anchored through the outer protective casing and the vapor barrier in the solid heat insulating layer; and
wherein an adhesive layer is provided between the heads of the headed screws and the protective casing and between the contact elements and the protective casing.

26. A cold-insulated pipe support as set forth in claim 25 characterised in that the contact elements are in a form of part-circular metal portions which extend along a circular arc of respective support shells and are fixed with a plurality of headed screws which are screwed in at spacings.

27. A cold-insulated pipe support as set forth in claim 26 characterised in that the part-circular metal portions are fixed with at least two respective rows, arranged in succession in an axial direction, of headed screws and the headed screws of the different rows are displaced relative to each other in a peripheral direction.

28. A cold-insulated pipe support as set forth in claim 25 characterised in that the headed screws are screwed into dowels anchored in the heat insulating layer.

29. A cold-insulated pipe support as set forth in claim 28 characterised in that the dowels are in a form of plastic screw dowels.

30. A cold-insulated pipe support as set forth in claim 29 characterised in that the dowels have plate-shaped heads which bear against the protective casing.

31. A cold-insulated pipe support as set forth in claim 30 characterised in that the contact elements are disposed at undersides towards the pipe support and are provided around screw holes with cylindrical countersunk portions which engage over the plate-shaped heads of the dowels.

32. A cold-insulated pipe support as set forth in claim 28 characterised in that there are provided pre-drilled blind holes for insertion of the dowels.

33. A cold-insulated pipe support as set forth in claim 32 characterised in that the blind holes are in a form of stepped bores.

34. A cold-insulated pipe support as set forth in claim 32 characterised in that the blind holes are at least partially filled with an adhesive material prior to introduction of the dowels.

35. A cold-insulated pipe support as set forth in claim 28 characterised in that the dowels are at least partially filled with an adhesive material before the headed screws are screwed in.

36. A cold-insulated pipe support as set forth in claim 25, in particular for retro-fitting of conventional pipe supports, characterised in that there is provided a cover plate for connection to an outer skin of the heat insulating layer, the cover plate partially overlaps the protective casing of the pipe support and dowels and headed screws also engage through the cover plate.

37. A cold-insulated pipe support for a pipeline, in particular for a low-temperature pipeline, comprising
   a receiving space for a pipe portion, the receiving space adapted to a cross-section of the pipeline,
   a heat insulating layer of solid insulating material that surrounds the receiving space, the receiving space extending axially through the heat insulating layer along a length of the pipeline;
   an outer protective casing having an axial length extending along a length of the pipeline;
   a vapor barrier arranged between the heat insulating layer and the outer protective casing; and
   at least two part-circular support shells each of the part-circular support shells having two ends and two lateral sides; wherein the part-circular support shells at least partially embrace the pipe, the ends of each of the part-circular support shells connected together by clamping screws,
      wherein one of the support shells is connected to a base carrying the pipe support,
      wherein the outer protective casing is axially fixed with respect to the two part-circular support shells; such that each of the two part-circular support shells are of a shorter axial length than the axial length of the outer protective casing,
   wherein free support portions are defined by exposed portions of the outer protective casing that extend beyond the lateral sides of the support shells and that are not covered by the support shells;
   wherein provided in the free support portions proximate the lateral sides of the support shells are contact elements which bear directly against the lateral sides of the support shells;
   wherein the contact elements are fixed by means of radially screwed-in headed screws which are anchored through the outer protective casing and the vapor barrier in the solid heat insulating layer; and
   wherein, in particular for retro-fitting of conventional pipe supports, there is provided a cover plate for connection to an outer skin of the heat insulating layer, the cover plate partially overlaps the protective casing of the pipe support and dowels and headed screws also engage through the cover plate.

38. A cold-insulated pipe support as set forth in claim 37 characterised in that the contact elements are in a form of part-circular metal portions which extend along a circular arc of the respective support shells and are fixed with a plurality of headed screws which are screwed in at spacings.

39. A cold-insulated pipe support as set forth in claim 38 characterised in that the part-circular metal portions are fixed with at least two respective rows, arranged in succession in an axial direction, of headed screws and the headed screws of the different rows are displaced relative to each other in a peripheral direction.

40. A cold-insulated pipe support as set forth in claim 37 characterised in that the headed screws are screwed into dowels anchored in the heat insulating layer.

41. A cold-insulated pipe support as set forth in claim 40 characterised in that the dowels are in a form of plastic screw dowels.

42. A cold-insulated pipe support as set forth in claim 41 characterised in that the dowels have plate-shaped heads which bear against the protective casing.

43. A cold-insulated pipe support as set forth in claim 42 characterised in that the contact elements are disposed at undersides towards the pipe support and are provided around screw holes with cylindrical countersunk portions which engage over the plate-shaped heads of the dowels.

44. A cold-insulated pipe support as set forth in claim 40 characterised in that there are provided pre-drilled blind holes for insertion of the dowels.

45. A cold-insulated pipe support as set forth in claim 44 characterised in that the blind holes are in a form of stepped bores.

46. A cold-insulated pipe support as set forth in claim 44 characterised in that the blind holes are at least partially filled with an adhesive material prior to introduction of the dowels.

47. A cold-insulated pipe support as set forth in claim 40 characterised in that the dowels are at least partially filled with an adhesive material before the headed screws are screwed in.

* * * * *